(12) United States Patent
Fujimoto

(10) Patent No.: US 8,117,070 B2
(45) Date of Patent: Feb. 14, 2012

(54) FIXED AMOUNT SALES SYSTEM

(75) Inventor: Masanori Fujimoto, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 2182 days.

(21) Appl. No.: 10/632,862

(22) Filed: Aug. 4, 2003

(65) Prior Publication Data

US 2004/0193498 A1 Sep. 30, 2004

(30) Foreign Application Priority Data

Aug. 5, 2002 (JP) ................................ 2002/227287

(51) Int. Cl.
*G06Q 20/00* (2006.01)
(52) U.S. Cl. ............ 705/23; 705/14; 700/231; 700/232; 700/283; 235/375; 235/381; 235/383
(58) Field of Classification Search ...................... 705/23
See application file for complete search history.

(56) References Cited

U.S. PATENT DOCUMENTS

2001/0020198 A1* 9/2001 Wilson ........................ 700/232

FOREIGN PATENT DOCUMENTS

| JP | 02-278495 | 11/1990 |
|----|-----------|---------|
| JP | 05-035972 | 2/1993 |
| JP | 08-119396 | 5/1996 |
| JP | 08-194864 | 7/1996 |
| JP | 10-167395 | 6/1998 |
| JP | 2000-211697 | 8/2000 |
| JP | 2001-175948 | 6/2001 |
| JP | 2001-319248 | 11/2001 |
| JP | 2001-160173 | 12/2001 |

OTHER PUBLICATIONS

Swift, Melanie. what's new in leisure & hospitality.(new products and equipment). Leisure & Hospitality Business , p. S1 , Mar. 8, 2001.*

* cited by examiner

*Primary Examiner* — F. Zeender
*Assistant Examiner* — Fawaad Haider
(74) *Attorney, Agent, or Firm* — Whitham Curtis Christofferson & Cook, PC

(57) ABSTRACT

A fixed amount sales system adopted in a gasoline stand or the like for preventing operation efficiency reduction which is the case due to independent payments of fuel supply charge and option item amount is disclosed. In the fixed amount sales system, in which the amount of gasoline corresponding to balance amount as a difference of the money amounts of items desired to be bought by a customer among option items (or TBA items) from a preliminarily selected fixed amount is sold by weighing, thus making the giving and taking of small amounts of money and changes between the customer and the shop unnecessary. The fixed amount of money and option items as selected by the customer, are displayed on a menu 22 in the POS terminal 20 for selection by a touch operation of electronic buttons or the like.

4 Claims, 2 Drawing Sheets

FIXED AMOUNT SALES SYSTEM

BACKGROUND OF THE INVENTION

This application claims benefit of Japanese Patent Application No. 2002-227287 filed on Aug. 5, 2002, the contents of which are incorporated by the reference.

The present invention relates to fixed amount sales systems and, more particularly, to a fixed amount sales system, which permits a customer in a gasoline stand or like shop to receive fuel supply or like service by specifying an amount of money.

A customer who wants to receive a fuel supply service in a gasoline stand or like shop, goes to the shop by driving his or her car. For the fuel supply in the shop, the fuel supply equipment is operated by a shop staff or by the customer himself or herself as self-service. At this time, in order to avoid payment and change return of small amounts of money and thus increase the process speed for both the customer and the shop, a fixed amount fuel supply service is provided.

Specifically, the customer preliminarily specifies a fixed amount of money, for instance 2,000 Yen, and then receives a fuel supply service corresponding to this amount. In this way, only payment of the constant amount (i.e., 2,000 yen in this case) is made between the customer and the shop, and no small amount of money is given or taken. Thus, it is possible to increase the process speed, which is a great merit for both the customer and the shop.

Among the prior art techniques in this technical field are, for instance, "Display Device" disclosed in Japanese Patent Laid-Open No. 2000-211697, "Sales Data Processing System" disclosed in Japanese Patent Laid-Open No. 5-35972, "POS System" disclosed in Japanese Patent Laid-Open No. 8-119396, "Fuel Service Station" disclosed in Japanese Patent Laid-Open No. 8-194864, "Fuel Supply System," disclosed in Japanese Patent Laid-Open No. 10-167395 and "Item Sales Apparatus" disclosed in Japanese Patent Laid-Open No. 10-324398.

In gasoline stands or like shops, however, it is ready to provide not only gasoline but also many, relatively inexpensive option items (i.e., TBA items) that maybe required by drivers, such as soft drinks, snack cakes, tobacco and chewing gum. To buy such items, the customer has to prepare changes for payment. No prior art technique shows a means for solving such problem. Therefore, the merits of the fixed amount fuel supply service can not be utilized, which is inconvenient for both the customer and the shop.

SUMMARY OF THE INVENTION

The present invention was made in view of the problems not addressed in known prior art techniques and it has an object of providing a fixed amount sales system capable of fixed amount sales inclusive of amounts of option items.

According to an aspect of the present invention, there is provided a fixed amount sales system comprising a POS terminal for selling items present in a shop by weighing at a fixed amount as desired by a customer, wherein: the items corresponding to a balance amount as a difference of an amount of option items to be bought by the customer among the option items present in the shop from the fixed amount.

In the POS terminal, a plurality of fixed amounts are displayed for selection by the customer. Option items which can be bought in the selected fixed amount are displayed on a display unit in the POS terminal. A plurality of option items can be selected within the selected fixed amount. The POS terminal issues an option item ticket for the option items selected by the customer together with a sales receipt. The option item ticket has a print of a bar code. The shop is a gasoline stand.

Other objects and features will be clarified from the to following description with reference to attached drawings.

PREFERRED EMBODIMENTS OF THE INVENTION

Preferred embodiments of the present invention will now be described with reference to the drawings.

Figure 1:
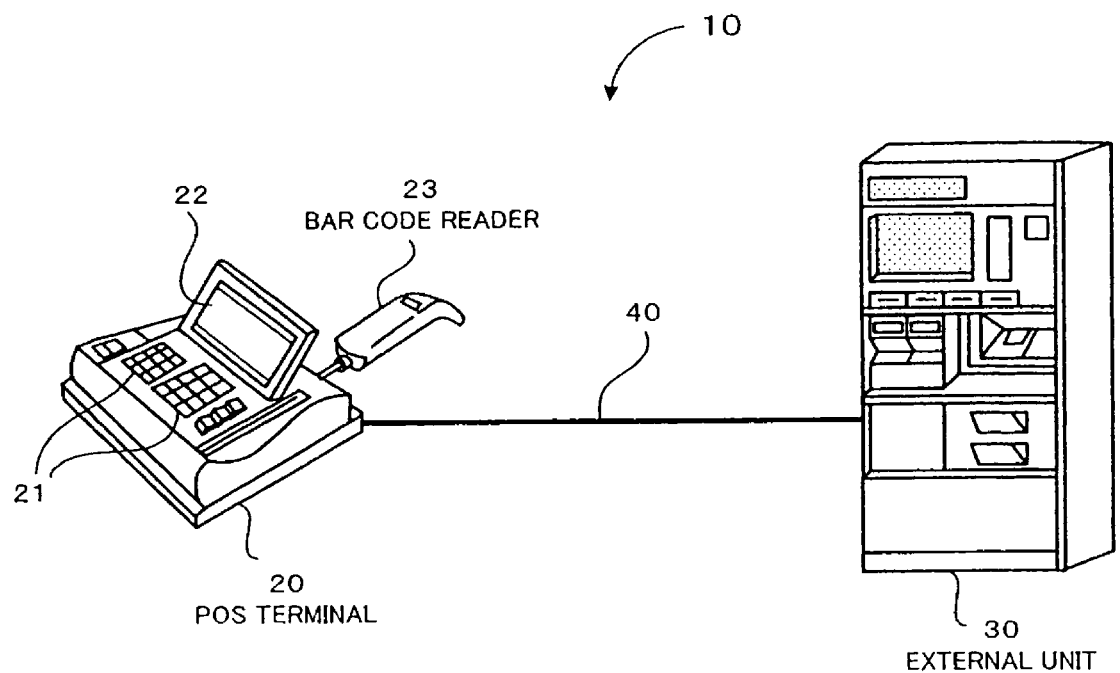
FIG. 1 is a schematic of the system of a preferred embodiment of the fixed amount sales system according to the present invention.

FIG. 1 is a schematic of the system of a preferred embodiment of the fixed amount sales system according to the present invention. This fixed amount sales system 10 comprises a POS (point of sales) terminal 20 and an external unit 30 connected thereto via a cable 40. The POS terminal 20 includes a keyboard 21 as input means for inputting amounts of money and so forth, a display unit 22, for instance liquid crystal display panel, for displaying inputted data or the like, and a bar code reader 23. The external unit 30 is, for instance, a well-known gasoline feeder.

Figure 2:
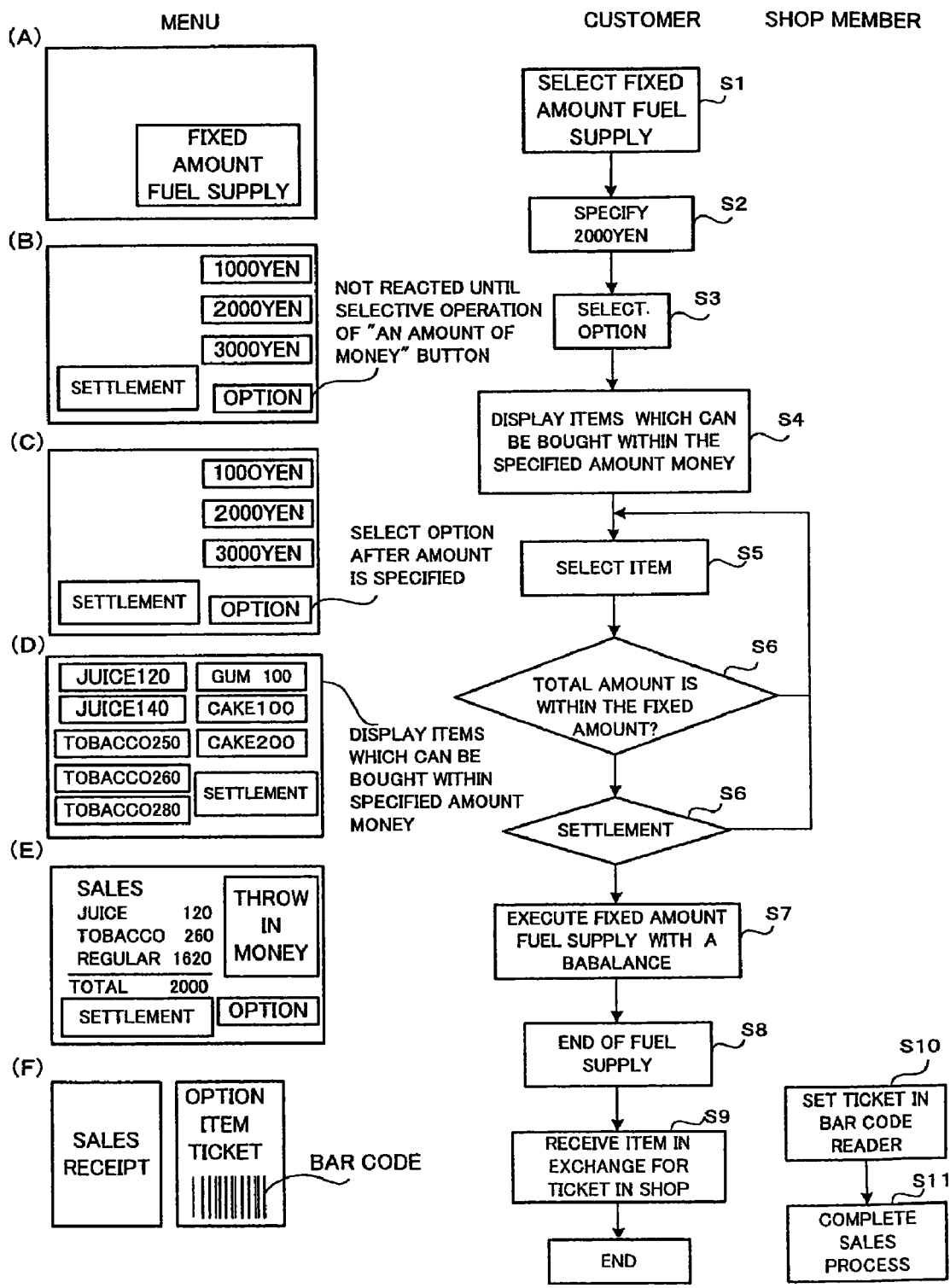
FIG. 2 shows display menus on the display unit 22 of the POS terminal 20, a flow chart of customers operations and shop staff's operations.

A series of "sales process" operations as operations of the fixed amount sales system shown in FIG. 1 according to the present invention, will now be described with reference to FIG. 2. In FIG. 2, display menus on the display unit 22 of the POS terminal 20 are shown on left part, a flow chart of customers operations is shown in central part, and shop staff's operations are shown on right part. For the sake of the brevity, the illustrated operation routine concerns an example, in which a customer buys (obtains) regular gasoline supply and also juices and tobacco packs with a fixed amount of 2,000 yen.

First, the shop staff confirms the customer's desire, that is, "fixed amount fuel supply section" as to whether the customer desires fixed amount fuel supply is made (step S1). When the fixed amount fuel supply is selected, the shop staff specifies fixed amount fuel supply by operating the keyboard 21 in the PCS terminal 20 or touching "fixed amount fuel supply" displayed on a menu shown in (A) in FIG. 2 with a finger or the like.

Then, the amount is specified (step S2). With the selection of the fixed amount fuel supply in the above step S1, a menu as shown in (B) in FIG. 2 is displayed. Specifically, a plurality of "amounts of money", e.g., 1,000 yen, 2,000 yen and 3,000 yen, and also "option" and "settlement" buttons are displayed. As an example, the 2,000 yen button is selected. Preferably, the selected amount of money is made clear by enclosing the selected amount, (e.g., 2,000 yen), in a bold frame or displaying the sole selected amount (i.e., erasing the non-selected amounts). The "option" button is not reacted until an "amount of money" button is selected.

Then, when the customer desires the "option", he or she selects the "option" by touching the "option" button on the menu shown in (C) in FIG. 2 (step S3). When the "option" is selected, an "item display" menu as shown in (D) in FIG. 2 is provided, in which items which can be bought within the specified amount of money are displayed (step S4). In this example, item names and amounts of money, such as "Juice 120", "Juice 140", "Tobacco 250", "Tobacco 260", "Tobacco 280", "Chewing gum 100", "Cake 100" and "Cake 200", are displayed.

The customer then makes "item selection" of one or more items displayed on the menu (step S5). In this example, the customer specifies "Tobacco 260". Then, a check is made as to whether the total amount is within the previously selected fixed. amount (i.e., 2,000 yen in this example) (step S6). When the total amount is within the fixed amount, the routine goes back to the step S5. In this step 5, it may be possible to also select a different item.

When the selection of the desired option items has been completed, the "settlement" button is touched (step S6). Until the touching of the "settlement" button, items which can be bought within the difference of the amount of the added TBA items from the fixed amount (of 2,000 yen), are held displayed on the menu. The customer thus additionally buys "Juice 120".

Then, a balance corresponding to the difference of the option item amount from the fixed amount (i.e., 2,000 yen) is displayed on a menu shown in (E) in FIG. 2, and the fixed amount fuel supply process is executed (step S7). When the fuel supply is ended (step S8), as shown in (F) in FIG. 2, a "sales receipt" with corrective amount data of the fuel supply and the option items and also an "option item ticket" are printed and issued from the POS terminal 20 (step S9). This "option Item ticket" has an impression of a "bar code".

The customer enters the shop with a carried slip with an option item bar code printed thereon. The customer then receives items in exchange with the slip with the option item bar code printed thereon from the shop staff. The shop staff sets the received slip in the bar code reader 23 for reading the data (step S10). In the above way, the sales process is completed (step S11).

While the above embodiment has been described in connection with the gasoline stand fuel supply example, this is by no means limiting, and the resent invention is applicable as well to all items capable of being sold by weighing, such as kerosene for petroleum stove or the like, soy sauce and rice, and also related option items.

As has been described in the foregoing, with the fixed amount sales system according to the present invention the following pronounced practical effects are obtainable. In the first place, since the cash exchanged in the sales is the sole fixed amount (of 2,000 yen, for instance) inclusive of option item amounts, the customer need not make a time-consuming plurality of payments when obtaining fuel supply and option items (or TBA items).

Secondly, since no change is exchanged in option item sales in the shop, it is possible to greatly reduce the changes prepared on the shop side and thus greatly improve the operation efficiency.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

The invention claimed is:

1. A fixed amount sales system associated with a gasoline stand, comprising:
　a point of sales (POS) terminal:
　a display associated with the POS terminal;
　wherein said display displays a plurality of fixed amount selections for fuel,
　wherein said POS terminal is used to select one fixed amount selection from said plurality of fixed amount selections for fuel,
　wherein said display, after selection of said one fixed amount selection is made with said POS terminal, selectively displays one or more option items to be purchased, each option item being associated with an option item amount, each option item displayed having an option item amount which is less than said one fixed amount selection made with said POS terminal, and upon selection of one or more option items displays as a balance amount
　a difference between said one fixed amount selection and any option item amounts for option items to be purchased, and
　wherein said POS terminal permits fueling at said gasoline stand in an amount equal to said balance amount.

2. The fixed amount sales system according to claim 1, wherein the POS terminal issues an option item ticket for said option items purchased and a sales receipt.

3. The fixed amount sales system according to claim 2, wherein said option item ticket includes a bar code.

4. A fixed amount sales method of claim 1, wherein the POS terminal outputs a receipt for the sales as well as a coupon for option items chosen by a customer.

* * * * *